US008156682B2

(12) United States Patent
Dahlberg

(10) Patent No.: US 8,156,682 B2
(45) Date of Patent: Apr. 17, 2012

(54) SWIMMING FROG LURE AND METHOD

(75) Inventor: Larry J. Dahlberg, Taylors Falls, MN (US)

(73) Assignee: Larry J. Dahlberg, Taylors Falls, MN (US)

( * ) Notice: Subject to any disclaimer, the term of this patent is extended or adjusted under 35 U.S.C. 154(b) by 720 days.

(21) Appl. No.: 12/018,195

(22) Filed: Jan. 23, 2008

(65) Prior Publication Data

US 2009/0183418 A1  Jul. 23, 2009

(51) Int. Cl.
*A01K 85/00* (2006.01)

(52) U.S. Cl. ............ 43/42.3; 43/42.1; 43/42.47

(58) Field of Classification Search ........... 43/42.3, 43/42.03, 42.1, 42.22, 42.41, 42.47
See application file for complete search history.

(56) References Cited

U.S. PATENT DOCUMENTS

| | | | | |
|---|---|---|---|---|
| 1,232,211 A * | 7/1917 | Burkman | ............ | 43/42.22 |
| 1,711,200 A * | 4/1929 | Heddon | ............ | 43/42.3 |
| 1,833,522 A * | 11/1931 | Goble | ............ | 43/42.13 |
| 2,250,478 A * | 7/1941 | Franks | ............ | 43/42.3 |
| 2,425,272 A * | 8/1947 | Walker et al. | ............ | 43/42.47 |
| 2,611,205 A * | 9/1952 | Steel | ............ | 43/42.3 |
| 3,319,371 A * | 5/1967 | Kinnee | ............ | 43/42.09 |
| 3,376,663 A * | 4/1968 | Amrine | ............ | 43/42.02 |
| 3,868,784 A * | 3/1975 | Sabol | ............ | 43/42.23 |
| 4,177,597 A * | 12/1979 | Thomassin | ............ | 43/42.3 |
| 5,009,024 A * | 4/1991 | Parman | ............ | 43/42.3 |
| 6,195,930 B1* | 3/2001 | Sato | ............ | 43/42.3 |
| 2006/0265936 A1* | 11/2006 | Wilkinson | ............ | 43/42.47 |

* cited by examiner

*Primary Examiner* — Kimberly Berona
(74) *Attorney, Agent, or Firm* — Richard T. Ogawa; Ogawa P.C.

(57) ABSTRACT

A frog lure device imitating life-like swimming action. The device has a diving "collar" disposed around an upper region of the lure body which causes the lure body to dive. Concurrent with the diving action, the lure has a kicking action such when given a single pull followed by a rest, the frog lure responds by diving from a surface region of the water to a depth beneath the surface region, straightening its legs as it moves forward and as the lure comes to rest, the legs retract. The collar forms a trail of bubbles and a vortex behind it. The pair of legs has a suitable length to not become trapped in the vortex, such that the legs straighten out to cause a kicking action and also provide stability to the lure as it accelerates through the water. The frog lure device can also be crawled across surface vegetation.

34 Claims, 5 Drawing Sheets

SWIMMING FROG LURE AND METHOD

CROSS-REFERENCES TO RELATED APPLICATIONS

NOT APPLICABLE

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

BACKGROUND OF THE INVENTION

The present invention relates generally to fishing techniques and in particular to fishing lures. More particularly, the invention provides a swimming frog lure and method, which can dive and swim like a live frog, according to a specific embodiment. Merely by way of example, the invention has been applied to a molded plastic soft fishing lure, but it would be recognized that other applications exist.

One of the greatest sporting activities known to mankind is fishing. Human beings involved in the activity of fishing are often called "fisherman" or "fisherwoman." Fishing often involves using a bait, whether natural or artificial, which is attached to one or more hooks that are tied to a line from a fishing rod and reel. The bait is introduced into a lake, stream, or ocean to attract and lure a fish to strike it. Once the fish strikes, sharp hooks often hidden by the bait pierce into the tissue of the fish. Often times, the fish becomes hooked in the mouth. After a struggle between the fisherman and the fish, one of them wins. Either the fisherman happily lands the fish or the fish breaks itself from the hook and swims away. At one time, fishing was performed predominantly for survival purposes to catch and eat as food and enjoy for a meal. More recently, fisherman now participate in the act of fishing purely for the "sport" of catching the fish, which is often released back into the water after it has been caught. Sport fisherman often use artificial baits to entice and catch the fish.

In sport fishing, artificial bait is often called a lure, which is an object attached to the end of the fishing line. The artificial bait is often designed to resemble and move like an item of fish prey. See, http://en.wikipedia.org. Often times, the lure is equipped with one or more hooks that hold the fish attracted to the lure. Lures can be made using hard plastic, soft plastics, metal, wood, and any of their combinations. A wide variety of colors can also be used on the lures.

Many types of fishing lures exist. Lures often imitate smaller bait fish, snakes, ducks, crawfish, worms, and other small animals capable of attracting a larger predatory fish. An example of a fishing lure for large predatory fish such as black bass is an imitation frog lure, commonly called "frogs." Imitation frog lures have been around for over 100 years. Many have been somewhat realistic in their static appearance. The frogs are made of realistic plastic material and painted to resemble real frogs. Although somewhat successful, conventional frog lures still have many limitations. One major drawback of conventional frog lures is that they do not seem to have a good imitation of the actual swimming movement of a frog in water.

That is, to provide movement in water, conventional frogs were made using mechanical contraptions such as hinged levers and sliding shafts in an attempt to approximate the kick of a frogs legs. Soft plastic moldings of actual frogs have flexible legs that extend somewhat when the frog is accelerated forward but the movement is limited. Additionally, conventional frogs become unstable and lead to rotation of the frog as it moves through the water. Accordingly, conventional frog lures, although they may look like real frogs, lack the movement of real live frogs.

In other conventional designs, frog lure manufacturers have given up on imitating a frog's actual movements. As an example, many of the popular conventional frogs have bodies similar to a frog shape and color, legs consisting of a multiple strands of thin rubber, which are designed to plane across surface vegetation. Of primary focus in the frog design is simple weedlessness capability. Although highly successful, conventional frogs still lack the ability to resemble movement of the real life frog. As noted, lure manufacturers have given up in some or all cases to come up with a lure design to imitate the frog's swimming action.

From the above, it is seen that improved techniques for lure designs are highly desired.

BRIEF SUMMARY OF THE INVENTION

According to the present invention, techniques for fishing are included. More particularly, the invention provides a swimming frog lure and method, which can dive and swim like a live frog, according to a specific embodiment. Merely by way of example, the invention has been applied to a molded plastic soft fishing lure, but it would be recognized that other applications exist.

In a specific embodiment, the present invention provides a frog lure device that has a life-like swimming action. In a preferred embodiment, the device has a diving "collar" disposed around an upper region of the lure body, rather than a lower region, which is common in conventional lure devices. In a specific embodiment, the collar causes the lure body to dive under the surface like a frog. Concurrent with the diving action, the lure device also has a kicking action to resemble a living frog. In a specific embodiment, the collar also forms a trail of one or more bubbles and a vortex, or slight vacuum behind it. In a specific embodiment, the lure body includes a pair of legs, which have a suitable length to be caught in the vortex and not become trapped in the vortex. The pair of legs also straighten out to cause a kicking action and also provide stability to the lure body as it accelerates through the water. As the frog device traverses through the water, the legs also slightly contract and extend to resemble a kicking action. In other embodiments, the frog lure device can be crawled across surface vegetation. When given a single pull followed by a rest, the frog lure responds by diving from a surface region of the water (or suspended position) to a depth beneath the surface region at an angle not unlike a real frog. Concurrent with the diving action, the frog lure straightens its legs imitating a kicking action as it moves forward. As the lure comes to rest again, the legs coupled to the lure retract. At rest, the frog lure may suspend itself temporarily at a certain depth or begin to raise toward the surface of the water. Just like a real frog!

In alternative embodiments, the frog lure can be retrieved using a combination of a steady pull and stopping action. As an example, if the frog lure is retrieved with a steady pull/stop swimming motion and not allowed to resurface after the frog lure stops, the frog lure continues to dive to a depth (e.g., 3 inches, 6 inches, 8 inches, 10 inches, 24 inches). Of course, there can be other variations, modifications, and alternatives. In other embodiments, at any time during the retrieve, the frog lure may be allowed to rest, which causes the lure to rise from the depth and return to the surface region. Once on the surface, the frog lure can be popped again to create a fish attracting trail of bubbles and appear to dive and kick like a real frog. In a specific embodiment, the legs can also be removed and replaced with similar or other types of legs to change swimming performance.

Depending upon the embodiment, the diving collar may be configured to achieve a desired frog lure action. That is, the angle, position, forward or back, material, size, and specific shape of the diving collar may greatly affect the action of the lure. In a specific embodiment, the diving collar also serves as a weed guard. That is, the weed guard serves to maintain the hook and other portions of the body substantially free to entanglement with weeds or other undesirable objects. In a specific embodiment, the collar can be made of a molded material, which is optically transparent or have a colored finish or any combination of these. Additionally, the collar can be made of a plurality of fibers or other materials in other embodiments. Depending upon the embodiment, the collar can also be planar and/or shaped in an annular, conical, or other configuration, including any combinations. In a specific embodiment, the collar can also be weighted and/or made of a buoyant material and/or other combinations, which allow the frog to land upright and float. That is, the collar may have a small weight toward a lower region or portion, while the upper region is buoyant according to a specific embodiment.

In a specific embodiment, the present invention provides a frog lure device, which is life like and imitates a swimming frog. The lure device has a head member having a nose end and a first body end and a hook eye protruding from the head member. The device has a body member extending from the first body end of the head member to a tail end. The device has a tail member having a rear end and a second body end, which extends from the tail end of the body member. The device has a hook shank extending from the hook eye to a hooked portion curving back toward the head member and a hook tip directed toward the head member and extending from the hooked portion. The hook top is at a determined height from the hook shank. Alternatively, the hook may be provided outside of the frog lure in other embodiments.

In a preferred embodiment, the lure device has a collar member configured around an annular periphery of the body member. The collar member extends to a region within a vicinity of the determined height to maintain the hook tip free from one or more weeds while the frog is in a moving state from a stationary state. The frog device also has at least one pair of frog leg members. The frog leg members include a first leg extending from a first rear portion of the body member. The first leg includes a first thigh portion, a first leg portion, a first foot, and a first joint coupling the first thigh portion to the first leg portion. The leg members also include a second leg extending from a second rear portion of the body member. The second leg includes a second thigh portion, a second leg portion, a second foot, and a second joint coupling the second thigh portion to the second leg portion. In a specific embodiment, the frog lure legs include a retracted configuration of the first leg and the second leg while the frog is in the stationary state and an extended configuration of the first leg and the second leg while the frog is in the moving state.

One or more benefits can be achieved using the present invention over conventional techniques. The present invention can be made using conventional materials and components according to a specific embodiment. Additionally, the invention can be applied to a frog lure and other like lures. In a preferred embodiment, the present invention provides a frog lure having a collar member and lifelike legs to simulate a swimming action as the frog lure traverses through a body of water without rotating. In a preferred embodiment, the present frog lure has a pair of legs configured for a kicking action, including a stationary state, suspended state, and one or more extended states. These and other benefits have been described throughout the present specification and more particularly below.

Various additional objects, features and advantages of the present invention can be more fully appreciated with reference to the detailed description and accompanying drawings that follow.

DETAILED DESCRIPTION OF THE INVENTION

According to the present invention, techniques for fishing are included. More particularly, the invention provides a swimming frog lure and method, which can dive and swim like a live frog, according to a specific embodiment. Merely by way of example, the invention has been applied to a molded plastic soft fishing lure, but it would be recognized that other applications exist.

Figure 1:
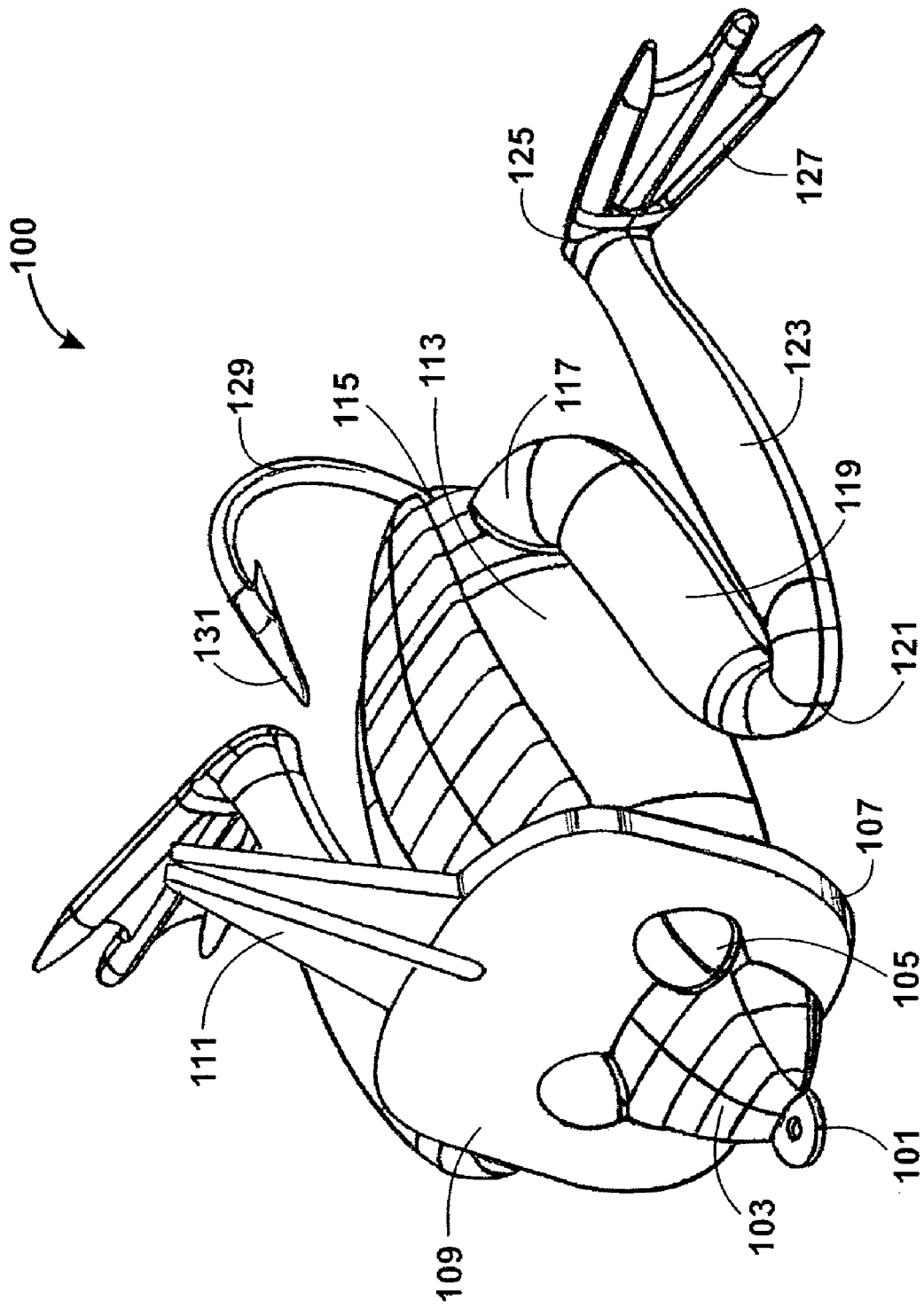
FIG. 1 is a simplified perspective illustration of a frog lure according to an embodiment of the present invention.

FIG. 1 is a simplified perspective illustration of a frog lure 100 according to an embodiment of the present invention. This diagram is merely an illustration and should not unduly limit the scope of the claims herein. One of ordinary skill in the art would recognize other variations, modifications, and alternatives. As shown, the frog lure is life like and can imitate a swimming frog. In a specific embodiment, the frog lure a made of a plastic material, which can be molded, carved, or stamped. In a preferred embodiment, the frog lure is made of a polymer plastic, foam plastic material, which is coated or finished to have a smooth and dense outer shell, but can be others. In a specific embodiment, the frog lure can be made of a solid soft plastic material (e.g., foam with a plurality of air pockets and dense outer shell), or a molded plastic, which has an air pocket or air pockets inside to cause a buoyant action of the frog lure. In a preferred embodiment, the frog lure is made of a polymer plastic such as polyvinyl chloride, or other suitable material, which can be a soft solid plastic, which can be characterized by a foam or other plastic material. In other embodiments, the frog lure can be made of a soft plastic and hollow in a center region to serve as an air pocket or the like. Of course, there can be other variations, modifications, and alternatives.

Referring to FIG. 1, the lure device 100 has a head member 103 having a nose end 101. In a specific embodiment, the head member has a first body end and a hook eye protruding from the head member. In a specific embodiment, the first body end extend to body member 113, although the frog lure has been illustrated as a continuous object free from any joints between the head member and body. A pair of eyes 105 are also disposed on respective regions of the head member according to a specific embodiment. In other embodiment, there may be a joint, although it must be within the spirit of the present invention.

As shown, the device has the body member 113 extending from the first body end of the head member to a tail end 115. As also shown, the device has a tail member having a rear end and a second body end, which extends from the tail end of the body member. The device has a hook shank extending from the hook eye to a hooked portion 129 curving back toward the head member and a hook tip 131 directed toward the head member and extending from the hooked portion. As shown, the hook top is at a determined height from the hook shank.

In a preferred embodiment, the lure device has a collar member 107 configured around an annular periphery of the body member. The collar member extends 109 to a region 111 within a vicinity of the determined height to maintain the hook tip free from one or more weeds while the frog is in a moving state from a stationary state. In a specific embodiment, the collar can be made of a plastic material, which is rigid in form and shape. The plastic material can be flat, annular, or any combination of these shapes, including scooped designs according to a specific embodiment. The collar can be made of a transparent plastic material, such as acrylic plastic or other like plastic materials, which are preferably scratch resistant. Depending upon the embodiment, the collar can also be configured with a weight, which would cause the frog lure to fall and sit in an upright position after the lure has been cast into the water. That is, the weight can be configured toward a bottom portion of the frog lure to give it a low center of gravity according to a specific embodiment. Of course, there can be other variations, modifications, and alternatives.

In a specific embodiment, the frog device also has at least one pair of frog leg members. The frog leg members include a first leg 117 extending from a first rear portion of the body member. The first leg includes a first thigh portion 119, a first leg portion 123, a first foot 127, and a first joint 121 coupling the first thigh portion to the first leg portion. The leg member also includes a joint 125 coupling the first leg portion to the first foot. A joint is also shown within a vicinity of reference numeral 117 to couple the first thigh portion to the first rear portion of the body member. Similarly, the leg members also include a second leg extending from a second rear portion of the body member. The second leg includes a second thigh portion, a second leg portion, a second foot, and a second joint coupling the second thigh portion to the second leg portion. In a specific embodiment, the frog lure legs include a retracted configuration of the first leg and the second leg while the frog is in the stationary state and an extended configuration of the first leg and the second leg while the frog is in the moving state. Depending upon the embodiment, the leg can be a solid plastic member or a combination of materials. Of course, there can be other variations, modifications, and alternatives.

Figure 2:
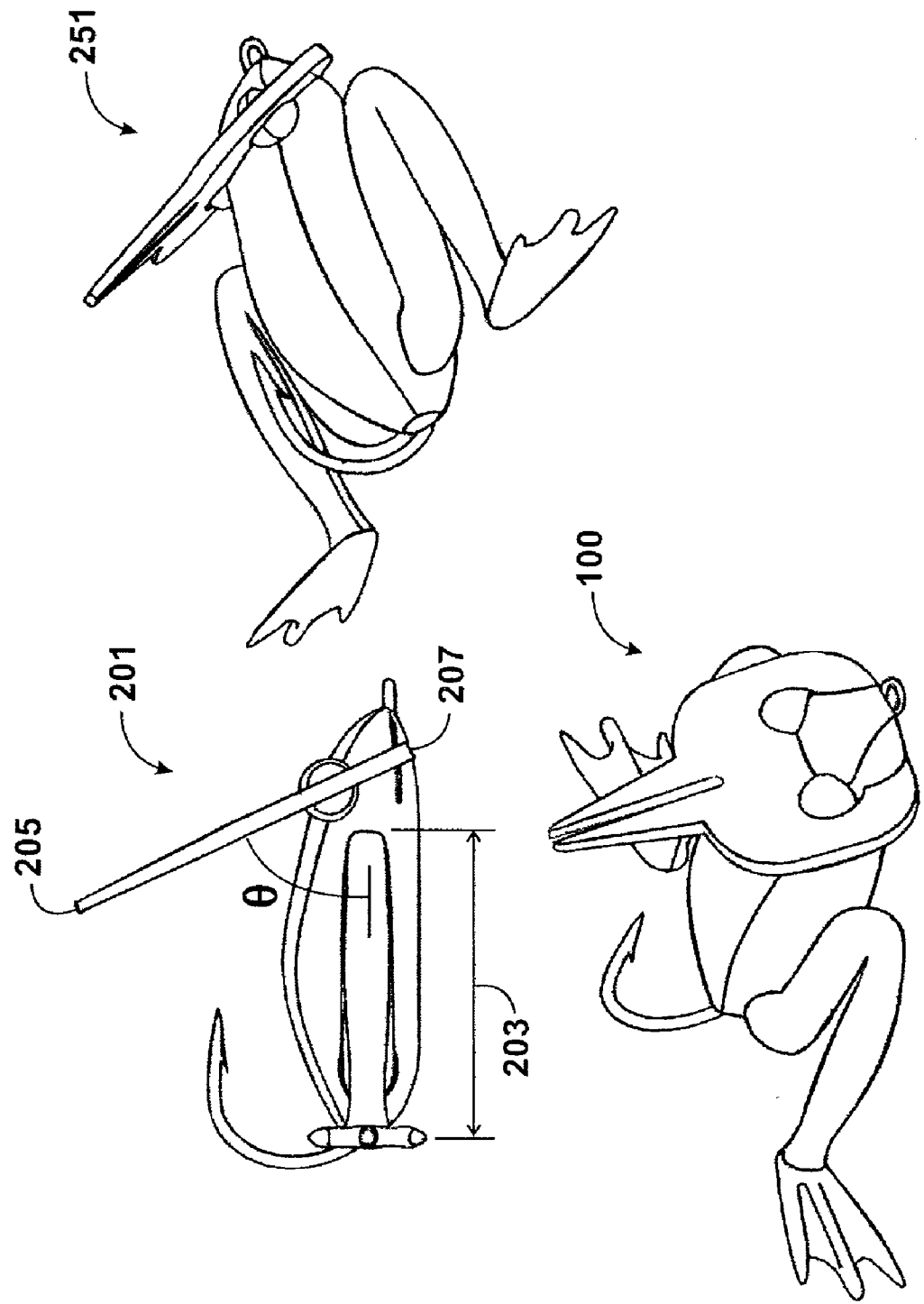
FIG. 2 is a simplified perspective, side-view, and back-view illustration of the frog lure according to an embodiment of the present invention.

FIG. 2 is a simplified perspective 100, side-view 201, and back-view 251 illustration of the frog lure according to an embodiment of the present invention. This diagram is merely an illustration and should not unduly limit the scope of the claims herein. One of ordinary skill in the art would recognize other variations, modifications, and alternatives. As shown in the side-view illustration 201, the frog lure device has a collar including a lower region and an upper region 205. As shown, the lower region is substantially flush with a bottom region of the body. In a preferred embodiment, the substantially flush configuration allows the frog lure to move across or through the water without becoming entangled with weeds, particulates, and other debris that may be in the water. Also, the collar member is configured at an angle (theta) between the member and frog body according to a specific embodiment. In a specific embodiment, the angle can be about 35 Degrees to about 85 Degrees, although other angles can be used. The angle is preferably adjusted to cause a diving action to achieve a selected depth in the water. In a specific embodiment, the angle can be selected to achieve a suitable diving action and/or suspending action. In a specific embodiment, the collar can be weighted (using a determined amount of lead, tungsten, or other metal material) within a vicinity of the lower region to cause the frog to sit in an upright position after casting the frog into the water. Of course, there can be other variations, modifications, and alternatives.

As noted, the collar may be configured to achieve a desired frog lure action. That is, the angle, position, forward or back, material, size, and specific shape of the diving collar may greatly affect the action of the lure. In a specific embodiment, the diving collar also serves as a weed guard. That is, the weed guard serves to maintain the hook and other portions of the body substantially free to entanglement with weeds or other undesirable objects. In a specific embodiment, the collar can be made of a molded material, which is optically transparent or have a colored finish or any combination of these. In a specific embodiment, the collar can be acrylic plastic or other suitable material. Additionally, the collar can be made of a plurality of fibers or other materials in other embodiments. Depending upon the embodiment, the collar can also be planar and/or shaped in an annular, conical, or other configuration. In a specific embodiment, the collar can also be weighted and/or made of a buoyant material. Of course, there can be other variations, modifications, and alternatives.

In a specific embodiment, the legs are also retracted at a distance 203 as illustrated by FIG. 2. Other illustrations of the retracted legs are provided in the other illustrations provided under reference numerals 100 and 251. In a specific embodiment, the retracted configuration has the legs folded in a relaxed or tucked position near the body of the frog. In a specific embodiment, the retracted configuration is generally not extended to a certain degree, although there can be a slight extension. Of course, there can be slight variations to the retracted configuration according to a specific embodiment. Further details of the frog lure can be found throughout the present specification and more particularly below.

Figure 3:
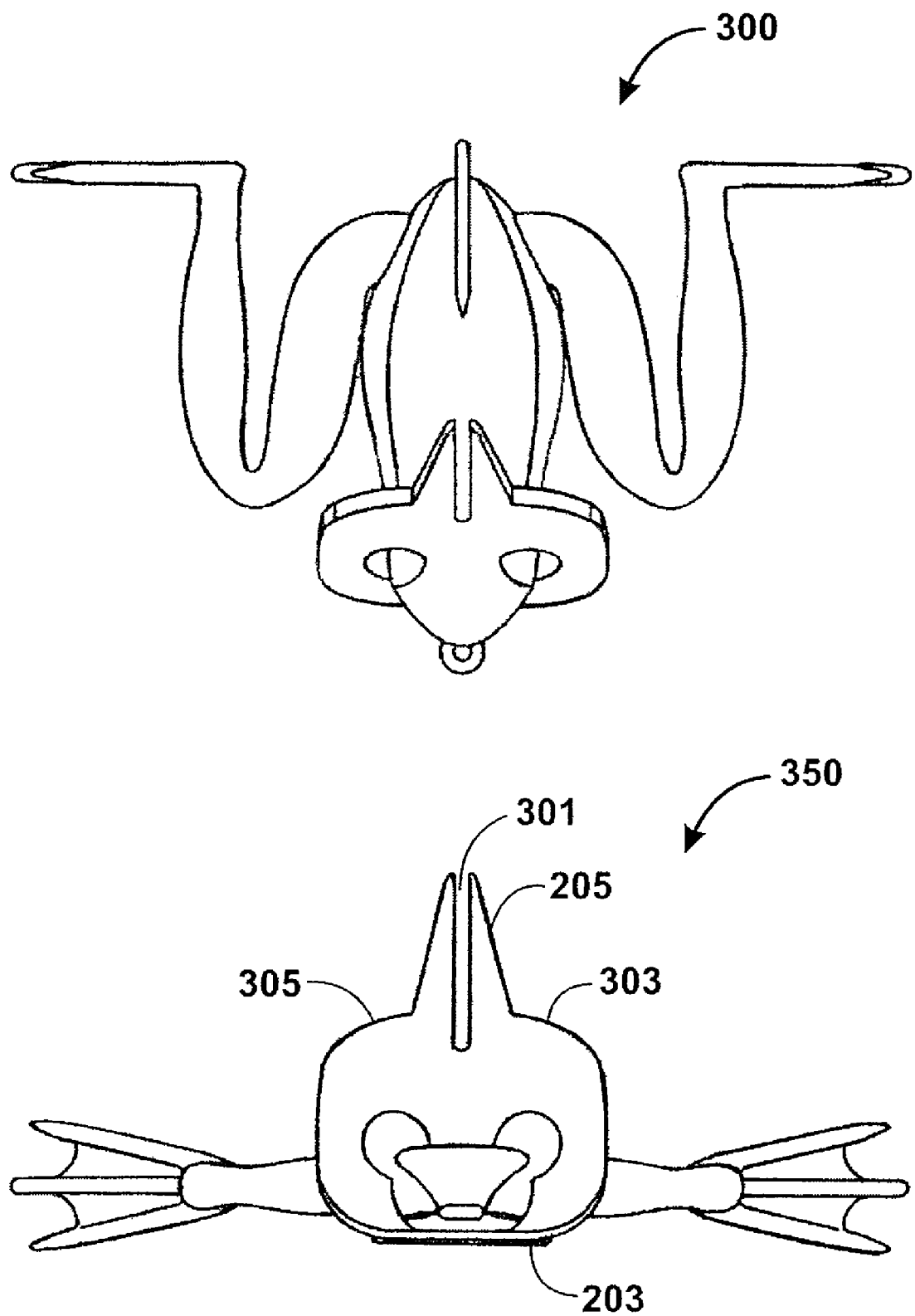
FIG. 3 is a simplified front-view and top-view illustration of the frog lure according to an embodiment of the present invention.

FIG. 3 is a simplified front-view 350 and top-view 300 illustration of the frog lure according to an embodiment of the present invention. This diagram is merely an illustration and should not unduly limit the scope of the claims herein. One of ordinary skill in the art would recognize other variations, modifications, and alternatives. As shown is a front-view illustration 350 of the frog lure. In a specific embodiment, the collar has the bottom region and upper region, which includes a protrusion that includes a slot or gap 301. The collar is configured as an annular member, which has the protrusion with gap. The gap allows for the collar to bend toward the hook while allowing the hook to traverse through the gap according to a specific embodiment. In a specific embodiment, the gap has a width that allows the hook to traverse through the gap and is also long enough to allow the hook to be free from contact from the collar. As an example, the hook tip can still penetrate a fish that may strike the upper region of the collar. Of course, there can be other variations, modifications, and alternatives.

Figure 4:
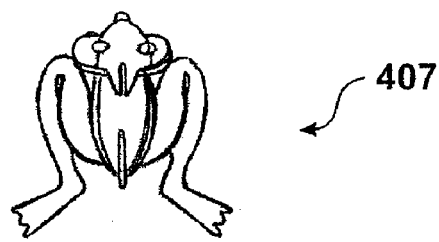
FIGS. 4 and 5 are simplified diagrams illustrating a swimming method of the frog lure according to an embodiment of the present invention.
Figure 4:
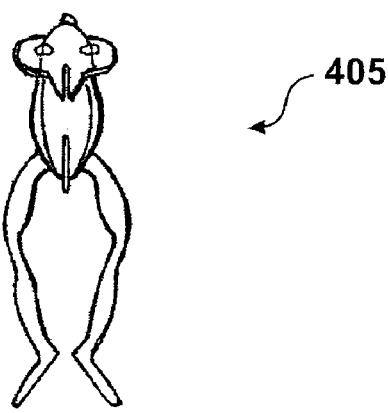
Figure 4:
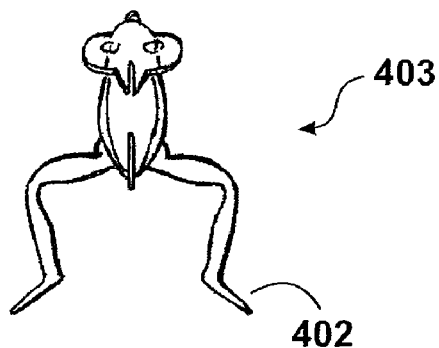
Figure 4:
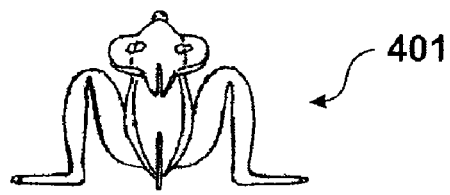
Figure 5:
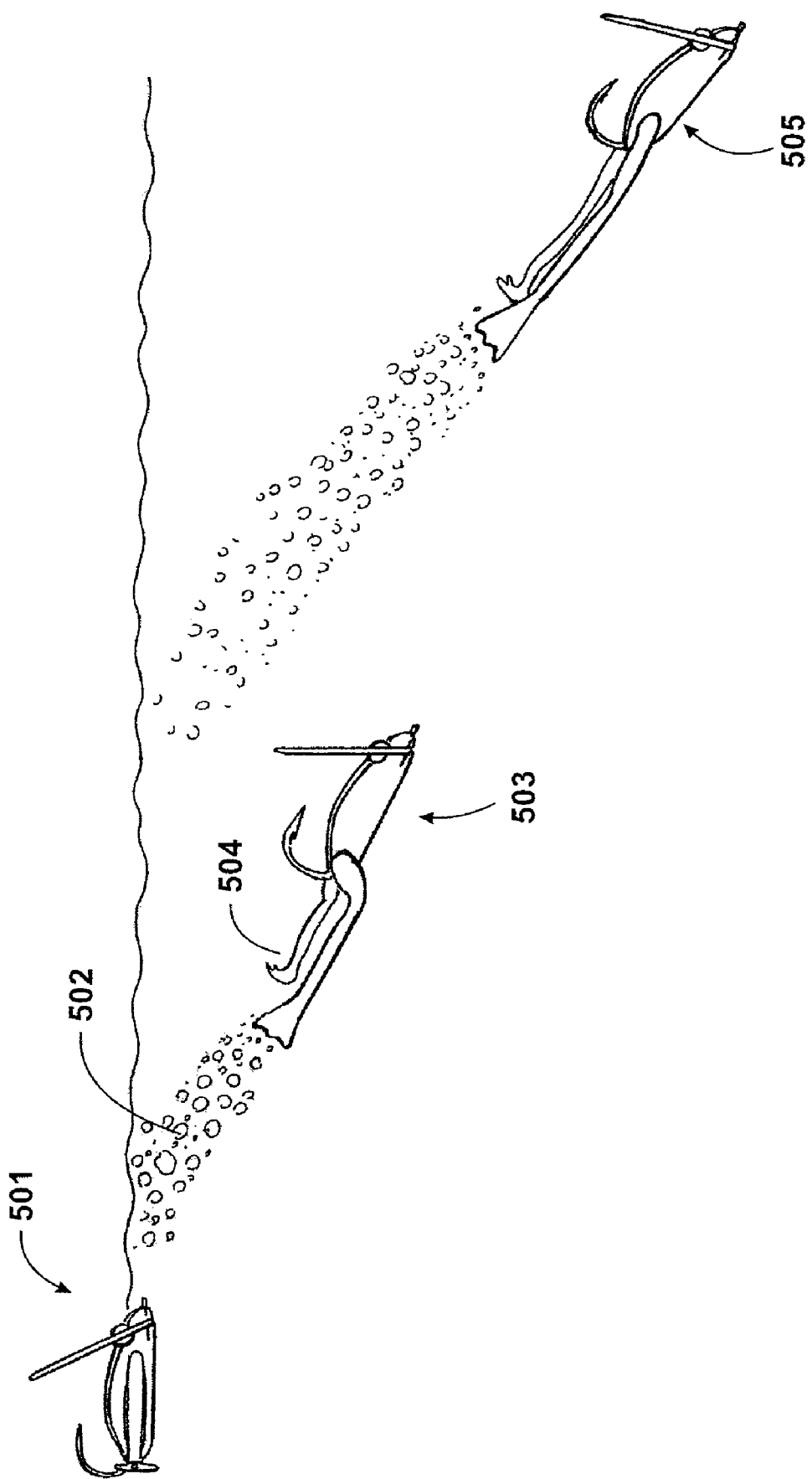

FIGS. 4 and 5 are simplified diagrams illustrating a swimming method of the frog lure according to an embodiment of the present invention. These diagrams are merely illustrations and should not unduly limit the scope of the claims herein. One of ordinary skill in the art would recognize other variations, modifications, and alternatives. As shown, the present method includes using a swimming frog lure, which is capable of a stationary, diving, suspending, and rising action, according to an embodiment of the present invention. Referring to reference numeral 401, the method includes providing a frog lure. The frog lure includes a head member having a nose end and a first body end. The frog has a hook eye protruding from the head member, a body member extending from the first body end of the head member to a tail end, and a tail member having a rear end and a second body end, which is from the tail end of the body member. The lure includes a hook shank extending from the hook eye to a hooked portion curving back toward the head member, a hook tip directed toward the head member and extending from the hooked portion. The hook top is at a determined height from the hook shank. The frog also has a diving bill member configured around an annular periphery of the body member. The diving bill member extends to a region within a vicinity of the determined height to maintain the hook tip free from one or more weeds while the frog is in a moving state from a stationary state.

At least one pair of frog leg members includes a first leg extending from a first rear portion of the body member. In a specific embodiment, the first leg includes a first thigh portion, a first leg portion, and a first foot, and a first joint coupling the first thigh portion to the first leg portion. The pair of leg members includes a second leg extending from a second rear portion of the body member, the second leg including a second thigh portion, a second leg portion, and a second foot, and a second joint coupling the second thigh portion to the second leg portion. In a preferred embodiment, the legs have a suitable length to allow the legs to extend and not be sucked up or trapped in a vortex region caused by a forward movement of the frog. Of course, there can be other variations, modifications, and alternatives.

In a specific embodiment, the method includes transferring the frog lure to a body of water using a casting or trolling process. That is, a line is tied to the frog lure can cast out to a body of water according to a specific embodiment. The method includes allowing the frog lure to be in a stationary state 401 to cause the first leg and the second leg to be in a retracted configuration. Referring now to FIG. 5, the frog lure is shown in a stationary state 501, which is floating or slightly immersed in the water. In a specific embodiment, the method includes moving (step 403) the frog lure from the stationary state to a moving state, using a pull or reel on the line tied to the frog lure, and cause the head member to be submersed by a diving action provided by the diving bill member configured around the annular periphery of the body member. In a specific embodiment, the diving action is illustrated by reference numeral 503 in FIG. 5. In a specific embodiment, the diving action also causes the first leg and the second leg to be in an extended configuration to imitate a kicking action. The kicking action is illustrated by reference numeral 402 in FIG. 4 and reference numeral 504 in FIG. 5. In a specific embodiment, the diving bill member causes the head member to move in a downward angle (reference numeral 503) from a surface region of water from the stationary state to the moving state.

Depending upon the embodiment, the frog lure can dive in a depth and be suspended. In a specific embodiment, the diving bill member causes the frog lure to move in a downward angle to a depth of at least one foot from a surface region of the water from the stationary state to the moving state. In an alternative embodiment, the diving bill member causes the frog lure to move in a downward angle to a depth of at least two feet from a surface region of the water from the stationary state to the moving state. Of course, there can be other variations, modifications, and alternatives.

Referring again to FIGS. 4 and 5, the frog lure continues to dive and each of the legs extend to a substantially extended state 405 505. As shown, the extended configuration of the first leg and the second leg further comprises at least a first extended state and a second extended state to imitate a swimming action while the frog is in the moving state. In a preferred embodiment, the first extended state having a longer spatial distance from the tail member than a shorter spatial distance from the tail member characterizing the second extended state. Of course, there can be other variations, modifications, and alternatives.

In a specific embodiment, the frog lure retracts each of its legs to a retracted state 407, as illustrated by FIG. 4. The retracted state can occur if tension is reduced on the line or the line is brought to a zero tension state according to a specific embodiment. In a preferred embodiment, the frog lure is pulled, allowed to swim, and stopped, which causes the legs to retract and allow the frog lure to suspend and/or raise to a surface region of the water. In a specific embodiment, the head member, body member, and tail member are in a floating state while the frog is in the stationary state.

In a preferred embodiment, the frog lure is pulled and allowed to dive while trapping one or more air pockets near a head region of the frog lure. As shown, the air pockets become submersed and bubbles 502 raise as the frog lure is pulled through the water. In a specific embodiment, the air pockets may become trapped and continue to raise bubble by bubble as the frog lure dives through the water, as illustrated by FIG. 5. Of course, there can be other variations, modifications, and alternatives.

It is also understood that the examples and embodiments described herein are for illustrative purposes only and that various modifications or changes in light thereof will be suggested to persons skilled in the art and are to be included within the spirit and purview of this application and scope of the appended claims. As an example, the method and device can be applied to other types of fishing lures such as minnows, snakes, mice, ducks, and others. Of course, there can be other variations, modifications, and alternatives.

What is claimed is:

1. A plastic frog lure comprising:
a head member having a nose end and a first body end;
a hook eye protruding from the head member;
a body member extending from the first body end of the head member to a tail end;
a tail member having a rear end and a second body end, the second body end being from the tail end of the body member;
a hook shank extending from the hook eye to a hooked portion curving back toward the head member;
a hook tip directed toward the head member and extending from the hooked portion, the hook top being at a determined height from the hook shank;
a diving bill member configured around an annular periphery of the frog lure, the diving bill member having an upper region and a lower region, the upper region of the diving bill member having a protrusion with a gap, the lower region of the diving bill member being substantially flush with a bottom region of the body member, the diving bill member being narrower within a vicinity of the determined height, the diving bill member being configured with an angle theta ranging from about 35 Degrees to about 85 Degrees, the diving bill member being configured as a weed guard extending to a region within a vicinity of the determined height to maintain the hook tip free from one or more weeds while the frog is in a moving state from a stationary state, the diving bill member trapping one or more air pockets near a head region of the frog lure to cause bubbles to rise as the frog lure is pulled through the water;

at least one pair of frog leg members including:
a first leg extending from a first rear portion of the body member, the first leg including a first thigh portion, a first leg portion, and a first foot, a first joint coupling the first thought portion to the first leg portion;
a second leg extending from a second rear portion of the body member, the second leg including a second thigh portion, a second leg portion, and a second foot, a second joint coupling the second thigh portion to the second leg portion;
a retracted configuration of the first leg and the second leg while the frog is in the stationary state; and
an extended configuration of the first leg and the second leg while the frog is in the moving state.

2. The lure of claim 1 wherein the diving bill member causes the frog lure to move in a downward angle to a depth of at least one foot from a surface region of the water from the stationary state to the moving state.

3. The lure of claim 1 wherein the diving bill member causes the frog lure to move in a downward angle to a depth of at least one foot from a surface region of the water from the stationary state to the moving state.

4. The lure of claim 1 wherein the diving bill member causes the frog lure to move in a downward angle to a depth of at least two feet from a surface region of the water from the stationary state to the moving state.

5. The lure of claim 1 wherein the head member, body member, and tail member are in a floating state while the frog is in the stationary state.

6. The lure of claim 1 wherein the head member comprises a first eye and a second eye.

7. The lure of claim 1 wherein the body member comprises a lower region characterized as a center of gravity of the frog lure.

8. The lure of claim 1 wherein the retracted configuration is a resting state.

9. The lure of claim 1 wherein the extended configuration is a kicked out state.

10. The lure of claim 1 wherein the diving bill is made of an optically transparent material.

11. The lure of claim 1 wherein the annular periphery of the frog lure is located within about 15% to 25% of the total length of the frog from the nose end to the tail end as measured from the nose end.

12. The lure of claim 1 wherein the extended configuration of the first leg and the second leg comprises at least a first extended state and a second extended state to imitate a swimming action while the frog is in the moving state.

13. The lure of claim 1 wherein the body member comprises one or more air pockets to float the frog.

14. The lure of claim 1 further comprising a vortex region in a back portion of the diving bill member.

15. The lure of claim 1 wherein the diving bill member is configured as a collar around the annular periphery of the frog lure.

16. The lure of claim 1 wherein the diving bill member is configured as a collar partially around the annular periphery of the frog lure.

17. The lure of claim 1 wherein the diving bill member is configured around the annular periphery of the frog lure is partially around the annular periphery or fully around the annular periphery.

18. A method for using a swimming frog lure, the method comprising:
providing a frog lure comprising:
a head member having a nose end and a first body end; a hook eye protruding from the head member, a body member extending from the first body end of the head member to a tail end; and a tail member having a rear end and a second body end, the second body end being from the tail end of the body member;
a hook shank extending from the hook eye to a hooked portion curving back toward the head member; a hook tip directed toward the head member and extending from the hooked portion, the hook top being at a determined height from the hook shank;
a diving bill member configured around an annular periphery of the frog lure, the diving bill member having an upper region and a lower region, the upper region of the diving bill member having a protrusion with a gap, the lower region of the diving bill member being substantially flush with a bottom region of the body member, the diving bill member being narrower within a vicinity of the determined height, the diving bill member being configured with an angle theta ranging from about 35 Degrees to about 85 Degrees, the diving bill member being configured as a weed guard extending to a region within a vicinity of the determined height to maintain the hook tip free from one or more weeds while the frog is in a moving state from a stationary state, the diving bill member trapping one or more air pockets near a head region of the frog lure to cause bubbles to rise as the frog lure is pulled through the water;
at least one pair of frog leg members including: a first leg extending from a first rear portion of the body member, the first leg including a first thigh portion, a first leg portion, and a first foot, a first joint coupling the first thigh portion to the first leg portion and a second leg extending from a second rear portion of the body member, the second leg including a second thigh portion, a second leg portion, and a second foot, a second joint coupling the second thigh portion to the second leg portion;
transferring the frog lure to a body of water;
allowing the frog lure to be in a stationary state to cause the first leg and the second leg to be in a retracted configuration; and
moving the frog lure from the stationary state to a moving state and cause the head member to be submersed by a diving action provided by the diving bill member configured around the annular periphery of the body member and cause the first leg and the second leg to be in an extended configuration to imitate a kicking action.

19. The method of claim 18 wherein the diving bill member causes the head member to move in a downward angle from a surface region of water from the stationary state to the moving state.

20. The method of claim 18 wherein the diving bill member causes the head member to move in a downward angle to a depth of at least one foot from a surface region of water from the stationary state to the moving state.

21. The method of claim 18 wherein the diving bill member causes the frog lure to move in a downward angle to a depth of at least two feet from a surface region of the water from the stationary state to the moving state.

22. The method of claim 18 wherein the head member, body member, and tail member are in a floating state while the frog is in the stationary state, the head member, body member, and tail member being made of a continuous plastic material.

23. The method of claim 18 wherein the head member comprises a first eye and a second eye.

24. The method of claim 18 wherein the body member comprises a lower region characterized as a center of gravity of the frog lure.

25. The method of claim 18 wherein the retracted configuration is a resting state.

26. The method of claim 18 wherein the extended configuration is a kicked out state.

27. The method of claim 18 wherein the diving bill is made of an optically transparent material.

28. The method of claim 18 wherein the annular periphery of the frog lure is located within about 15% to 25% of the total length of the frog lure from the nose end to the tail end as measured from the nose end.

29. The method of claim 18 wherein the extended configuration of the first leg and the second leg further comprises at least a first extended state and a second extended state to imitate a swimming action while the frog is in the moving state, the first extended state having a longer spatial distance from the tail member than a short spatial distance from the tail member characterizing the second extended state.

30. The method of claim 18 wherein the body member comprises one or more air pockets to allow the frog to float.

31. The method of claim 18 further comprising trapping a volume of air form a surface region and causing one or more air bubbles to rise to a surface region of the body of water.

32. A plastic frog lure device comprising:
   a head member having a nose end and a first body end;
   a hook eye coupled to the head member;
   a body member extending from the first body end of the head member to a tail end;
   a tail member having a rear end and a second body end, the second body end being from the tail end of the body member;
   a hook shank extending from the hook eye to a hooked portion curving back toward the head member;
   a diving bill member configured around an annular periphery of the frog lure, the diving bill member having an upper region and a lower region, the lower region of the diving bill member being substantially flush with a bottom region of the body member, the diving bill member being narrower within a vicinity of a determined height from the hook shank, the diving bill member being configured as a weed guard extending to a region within a vicinity of the determined height to maintain the hook tip free from one or more weeds while the frog is in a moving state from a stationary state, the diving bill member causing the plastic frog lure to dive and be immersed in water from a stationary state to a moving state; and
   at least one pair of frog leg members including:
      a first leg extending from a first rear portion of the body member, the first leg including a first thigh portion, a first leg portion, and a first foot, a first joint coupling the first thigh portion to the first leg portion;
      a second leg extending from a second rear portion of the body member, the second leg including a second thigh portion, a second leg portion, and a second foot, a second joint coupling the second tight portion to the second leg portion;
      a retracted configuration of the first leg and the second leg while the frog is in the stationary state; and
      an extended configuration of the first leg and the second leg while the frog is in the moving state.

33. The device of claim 32 wherein the diving bill member is configured as a collar around the annular periphery of the frog lure, the collar being configured at an angle theta from a horizontal line between the hook eye and the body member, the angle theta being configured to cause the plastic frog lure to dive and be immersed in water, the angle theta ranging from about 35 Degrees to about 85 Degrees.

34. The device of claim 33 wherein the collar is made of a plastic member or a plurality of plastic members or a plurality of fibers.

* * * * *